Patented Feb. 18, 1936

2,031,171

UNITED STATES PATENT OFFICE 2,031,171

MASTIC FLOOR TOPPING

Harry K. Linzell, Oak Park, Ill., assignor to United States Gypsum Company, Chicago, Ill., a corporation of Illinois No Drawing. Application May 5, 1932,
Serial No. 609,501

5 Claims. (Cl. 106—27)

This invention relates to a composition suitable for the surfacing of floors, walls, etc., which may be colored to permit its use where a decorative surface is desired.

It is desirable to apply to a mastic flooring or other type of flooring, a top surfacing material which will replace linoleum, tile, etc. This surfacing composition should be of such character that it can be scored off, if desired, to represent tile. The composition should also be capable of troweling for a considerable period of time in order to obtain a smooth, hard surface.

An object of this invention, therefore, is to provide a composition suitable for producing a floor surface to replace linoleum, tile, etc.

Another object of the invention is to provide a composition which will permit repeated troweling to obtain a hard, smooth surface, and which can be scored to represent tile; also to improve surfacing compositions in other respects hereinafter specified and claimed.

My improved topping composition may have the following formula:—

| | Percent |
|---|---|
| Keene's cement | 17–87 |
| Bituminous material (in emulsion) | 4–30 |
| Fillers | 0–75 |

In the above formula the $$\frac{\text{Keene's cement}}{\text{Bituminous material}} \text{ should be between } \frac{7}{1} \text{ and } \frac{2.25}{1}$$

subject to the considerations presented in the following disclosure.

The term "Keene's cement" is used to designate a combination of "dead burned gypsum" and certain accelerators which are added during its process of manufacture to control its set. Keene's cements with widely varying set characteristics are available. I prefer to use a Keene's with a set (without lime) of approximately 6 hrs. final. The accelerators used in Keene's cement are usually a mixture of aluminum sulphate and potassium sulphate which may be incorporated as such, or as the double salt commonly known as potash alum. The amount of accelerators in Keene's cement varies with the kind of rock from which it is made, burning conditions, etc. For example, the aluminum sulphate may be approximately 6 to 12 lbs. per ton while the potassium sulphate may be 5 to 15 lbs. per ton, depending on the above considerations as well as the exact setting time required. Certain substitutions can be made for these salts, for example, aluminum sulphate may be replaced with zinc sulphate, tin sulphate or cadmium sulphate, as well as by certain salts of copper, iron, etc., if their color is not objectionable; while the potassium sulphate may be replaced by sodium sulphate, lithium sulphate or sulphuric acid though there are certain objections to each of the latter which make them less suitable than the potassium sulphate. Salts with certain acid radicals other than the sulphate have been used though there is no advantage, and in the case of some of them, such as the chlorides and nitrates, there are disadvantages on account of the efflorescence which they cause, etc.

The bituminous or other plastic material in emulsion is an irreversible, aqueous emulsion, in which the water is the external phase. It must be stable in the presence of divalent and trivalent cations, particularly in the presence of calcium salts such as calcium sulphate. Plastic clays, and particularly bentonite, are satisfactory stabilizing agents, from 1 to 5% or even more clay is used, the amount being kept as low as possible.

The plastic material may be a liquid bitumen, such as asphalt or pitch, or it may be a water insoluble gum such as copal, or certain of the synthetic resins. Other materials, such as gilsonite mineral oils, animal or vegetable oils, linseed, cottonseed, fish oil, or China-wood oil, may be used in part with the above. Emulsions of rubber may also be added to impart elasticity. The plastic material must be such that when the water is dried out, the residue will be permanently plastic. Anti-oxidants may be added to improve the aging characteristics of the plastic material. It must also be such that it readily coalesces when the water is removed, and have the ability to "wet" the solid materials in the composition, such as the Keene's cement, sand, pigment and fillers.

For use with colors, the plastic material should be as light in color as possible. The penetration at 70° F. (as measured by the standard method for testing asphalts) can vary within wide limits. It must not be so low that the emulsion does not coalesce when the water is dried out, on the other hand the penetration should not be so high that the composition becomes soft under traffic. For asphalts, a penetration of 30 at 70° F. seems close to the lower limit, while an upper limit of about 120 is reasonable, though for special uses where the greatest hardnesses are not necessary, or where the climate is never warm, a higher penetration may be found satisfactory.

In the compositions disclosed, the ingredient bituminous or plastic material refers to the non-aqueous phase only, that is the water is not included in the percentage composition. The asphalt emulsion usually contains about 40% water.

For best results the fillers in the above composition should be properly graded from fine to coarse. The upper limit of coarseness is governed by the type of composition. For some uses, a sand as coarse as a 10 mesh may be satisfactory, while for other uses, a grading from 80 or 100 mesh and finer may be better. The pigment is considered to be a part of the filler. The composition may be varied between wide limits as shown above, depending upon the properties required.

Within limits, hardness is proportional to the Keene's plastic material ratio, this ratio being expressed as shown above by the expression $$\frac{\text{Percent of Keene's cement}}{\text{Percent of plastic material by weight}}$$

The greater this ratio the greater the hardness and the lower the masticity. The lower this ratio the less the hardness and the greater the masticity. It has been found that this ratio can vary from about $$\frac{7}{1} \text{ to } \frac{2.25}{1}$$

A ratio as high as 7 would give a hard surface, but with very little masticity. While its hardness is good it would have poor wear resistance and poor water resistance. On the other hand, because of its low proportion of plastic material, it would take colors excellently. Compositions in which the $$\frac{\text{Keene's cement}}{\text{Plastic material}}$$

ratio is as low as 2.25 are too soft for anything but the lightest traffic. They indent too easily for average use though the wear resistance and water resistance are high.

The proportion of filler can vary between wide limits, as well as its fineness of grind or grading. If a sand or crushed rock—dust free, with a screen test such that it all passes a 20 mesh and practically all remains on a 100 mesh screen is used, the total quantity of such an aggregate or filler in the composition may be high. In extreme cases up to 75% may be used, though this is a little too high for a good wearing floor. If on the other hand, a finer ground filler such as a 120 mesh silica or a mixture of such a silica and talc is used, the total proportion of such an aggregate or filler which can be used is lower,—approximately 50%. With a 200 to 300 mesh filler, the proportion which can be used with safety would be only 10 to 20%.

Where greater thicknesses are required, it is possible, of course, to include a much heavier or larger sized aggregate which will in no way influence the above proportion. For example, if a ½" thickness were being laid, a ¼" down aggregate can also be included. This is added in addition to the above and a quantity in weight equivalent to the Keene's cement plus the filler may be added. This quantity is not absolute, as it depends upon the grading of this coarse aggregate, permitting considerably more to be used if it is graded from this coarse size on down to the grading of the sand itself. A pleasing effect may be obtained by including such a coarse aggregate of a white or colored rock, and then when the composition is hard, grinding down the surface and so exposing the face of the aggregate which contrasts with the dark or colored mastic composition which cements it together, thus giving a terrazzo effect.

It has been found desirable but not essential to include a small proportion of flaky talc in the formula as a portion of the filler. This improves the troweling characteristics. Two to five percent is sufficient. A small proportion of asbestos, not over 1% may be included if desired. This improves application characteristics, but it must be used with discretion, as its use decreases hardness.

The coloring matter employed is included in the filler. It is usually of the mineral pigment type because these are cheapest, though it is not uncommon to employ chemical pigments or even dyes precipitated on satisfactory lakes. The pigment content is usually below 10%, the finer the grind of the pigment and the higher its coloring power, the less it is necessary to use. If the bituminous materials employed are exceedingly dark, then necessarily the proportions of pigments must be higher. On the other hand, with lighter colored plastic materials or substitutes for asphalt, less pigment can be employed. Iron oxide yellow, red oxide, and chromic oxide green are examples of suitable pigments. The pigment content may vary from 2% to 10%.

The following composition has given very satisfactory results:

| | Percent |
|---|---|
| Keene's cement | 37 |
| Asphalt (in emulsion) | 8 |
| Sand (thru 20 mesh) | 52–53 |
| Coloring matter | 2 |

To the above composition sufficient water is added to bring it to a mortar consistency. The Keene's cement usually contains less than 1% of accelerating salts based upon the dry composition.

A somewhat more general formula is as follows:

| | Percent |
|---|---|
| Keene's cement | 17–87 |
| Plastic material in emulsion | 4–30 |
| Flaky talc | 2–5 |
| Asbestos | less than 1 |
| Pigment filler | 2–10 |
| Aggregate filler | 0–70 |

Water to troweling consistency

It is obvious that such a composition as the above cannot be entirely pre-mixed, but the dry ingredients which include the Keene's cement and the filler, as well as the pigment, may be pre-mixed and the bituminous material in emulsion handled separately in drums. The correct proportion of the dry mixed materials and the plastic material in emulsion, together with sufficient water, are then mixed together on the job to the proper application consistency. 20 to 25 lbs. of water are usually needed per 100 lbs. of dry material to give the proper application consistency.

A variation of this which has also been found to work out satisfactorily is to mix the dry materials, excepting the Keene's cement and its accelerators, into the emulsion of the bituminous material. In this case the bituminous material in emulsion plus the fillers, which are also in suspension, are shipped to the job in drums and the correct proportion of Keene's cement, together with sufficient water, are then mixed with it at the time of using. The materials which have been mixed with water as described above at the time of using, are applied in a uniform layer onto the prepared flooring surface, then trowelled and re-trowelled as the stiffening progresses. After setting, and allowing to dry, it can be used as such or treated with certain waxes (in emulsion), varnish, lacquer or other surfacing liquid.

For certain uses, particularly when a quick set Keene's cement is used in the formula, the composition is suitable for casting. Attractive and serviceable tiles can be cast with it, preferably vibrating the mold, or casting under pressure, to get greater density. It also finds a use as a caulking compound, a glazing putty, and a wall surfacing composition. Its chief use, however, is for the surfacing of floors. Depending upon the exact composition, its hardness can be varied from that of a floor hard enough to withstand the concentrated loads of office furniture, etc., to a soft and more resilient floor suitable for showrooms, hospitals, corridors, etc. where resilience is desirable and hardness not as important.

I would state in conclusion that while the described examples constitute practical embodiments of my invention, I do not wish to limit myself precisely to these details, since manifestly, the same may be considerably varied without departing from the spirit of the invention as defined in the appended claims.

Having thus described my invention, I claim as new and desire to secure by Letters Patent:

1. A mastic flooring composition comprising dead-burnt anhydrous gypsum cement and an emulsion of bituminous material, said emulsion being stable in the presence of divalent and trivalent cations; and in which composition the ratio of the said cement to the bituminous material lies within the range of 7:1 and 2.25:1.

2. A mastic flooring composition comprising Keene's cement and an emulsion of an organic waterproofing material selected from the group consisting of asphalt, pitch, copal, synthetic resing, gilsonite, linseed oil, cottonseed oil, fish oil, and China-wood oil; said emulsion being of such a nature as to be stable and remain un-cracked in the presence of calcium ions; the ratio of Keene's cement to said waterproofing material lying within the range of 7:1 and 2.25:1.

3. A mastic flooring composition comprising Keene's cement and an asphaltic emulsion stable in the presence of calcium ions; the ratio of the cement to the asphalt in the emulsion lying within the range of from 7:1 to 2.25:1.

4. A mastic flooring composition comprising anhydrous calcium sulfate cement and a bitumen emulsion stabilized against cracking by calcium ions by the use of plastic clay as stabilizing agents; the ratio of cement to bitumen lying within the range of 7:1 and 2.25:1.

5. A mastic flooring composition which when freshly mixed remains trowelable for a sufficient time to permit smoothing and scoring, comprising Keene's cement, water, and emulsified bitumen containing plastic clay so as to render the resulting emulsion stable in the presence of dissolved calcium sulfate; the ratio of cement to bitumen lying within the range of 7:1 and 2.25:1.

HARRY K. LINZELL.